United States Patent
Ohzaki et al.

(10) Patent No.: US 10,803,161 B2
(45) Date of Patent: Oct. 13, 2020

(54) INFORMATION PROCESSING SYSTEM, INFORMATION PROCESSING METHOD, AND INFORMATION PROCESSING APPARATUS

(71) Applicants: Hiroki Ohzaki, Kanagawa (JP); Yasuharu Fukuda, Kanagawa (JP)

(72) Inventors: Hiroki Ohzaki, Kanagawa (JP); Yasuharu Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 326 days.

(21) Appl. No.: 15/876,568

(22) Filed: Jan. 22, 2018

(65) Prior Publication Data

US 2018/0268124 A1 Sep. 20, 2018

(30) Foreign Application Priority Data

Mar. 15, 2017 (JP) .................. 2017-049848

(51) Int. Cl.
*G06F 21/33* (2013.01)
*H04L 29/06* (2006.01)
(Continued)

(52) U.S. Cl.
CPC ............ *G06F 21/335* (2013.01); *G06F 21/10* (2013.01); *G06F 21/45* (2013.01);
(Continued)

(58) Field of Classification Search
CPC ........ G06F 21/335; G06F 21/45; G06F 21/10; G06F 21/6218; H04L 63/0807; H04L 63/104; H04L 2463/101
(Continued)

(56) References Cited

U.S. PATENT DOCUMENTS 6,519,571 B1 * 2/2003 Guheen .................. G06Q 30/02
                                                                  705/14.66
8,763,145 B2 * 6/2014 Mihara ............... G06F 21/6218
                                                                  726/26
(Continued)

FOREIGN PATENT DOCUMENTS

| JP | 5814639 | 11/2015 |
| JP | 2016-091115 | 5/2016 |
| JP | 5930847 | 6/2016 |

*Primary Examiner* — David J Pearson
*Assistant Examiner* — Badri Champakesan
(74) *Attorney, Agent, or Firm* — IPUSA, PLLC

(57) ABSTRACT

An information processing system includes multiple information processing apparatuses for providing a multitenant service. The information processing system is configured: to store a user account for each user belonging to one of a plurality of tenants provided by the multitenant service, the user account including a tenant ID of the tenant, and a role representing privilege of the user; to store license information assigned to each of the tenants, the license information including a license type representing a type of task allowed to be performed by the tenant; to receive a first request, from a first user belonging to a first tenant, for performing a task concerning a second tenant; and to determine, based on the role of the first user and the license information assigned to the first tenant, whether the performing of the task concerning the second tenant is allowed.

9 Claims, 13 Drawing Sheets

(51) Int. Cl.
*G06F 21/10* (2013.01)
*G06F 21/62* (2013.01)
*G06F 21/45* (2013.01)

(52) U.S. Cl.
CPC ...... *G06F 21/6218* (2013.01); *H04L 63/0807* (2013.01); *H04L 63/104* (2013.01); *H04L 2463/101* (2013.01)

(58) Field of Classification Search
USPC .......................................................... 726/27
See application file for complete search history.

(56) References Cited

U.S. PATENT DOCUMENTS

| | | | | |
|---|---|---|---|---|
| 8,904,549 | B2* | 12/2014 | Mogaki | G06F 21/62 707/703 |
| 9,275,195 | B1* | 3/2016 | Stine | G06F 21/10 |
| 9,294,456 | B1* | 3/2016 | Timmermans | H04L 63/083 |
| 9,485,280 | B2* | 11/2016 | Riley | H04L 63/20 |
| 9,514,291 | B2 | 12/2016 | Fukuda et al. | |
| 9,754,088 | B2 | 9/2017 | Ohzaki et al. | |
| 10,375,177 | B1* | 8/2019 | Bretan | H04L 63/0815 |
| 2002/0199123 | A1* | 12/2002 | McIntyre | H04L 63/104 726/3 |
| 2004/0039594 | A1* | 2/2004 | Narasimhan | G06F 21/10 705/1.1 |
| 2006/0149718 | A1 | 7/2006 | Ohzaki | |
| 2009/0217352 | A1* | 8/2009 | Shen | G06F 21/6218 726/3 |
| 2009/0235344 | A1 | 9/2009 | Ohzaki et al. | |
| 2010/0050267 | A1* | 2/2010 | Nochta | G06F 21/6236 726/27 |
| 2011/0264434 | A1* | 10/2011 | Jain | G06F 9/455 703/22 |
| 2012/0030329 | A1 | 2/2012 | Aoki et al. | |
| 2012/0215580 | A1* | 8/2012 | Barney | G06Q 10/00 705/7.16 |
| 2013/0198211 | A1 | 8/2013 | Kohkaki et al. | |
| 2013/0332477 | A1 | 12/2013 | Nagai et al. | |
| 2015/0312233 | A1* | 10/2015 | Graham, III | H04L 67/125 713/171 |
| 2016/0012210 | A1* | 1/2016 | Takemoto | G06F 21/10 726/28 |
| 2016/0125174 | A1 | 5/2016 | Matsushima | |
| 2016/0125177 | A1 | 5/2016 | Kashiyama et al. | |
| 2016/0127349 | A1 | 5/2016 | Nakajima et al. | |
| 2016/0127356 | A1 | 5/2016 | Fukuda et al. | |
| 2017/0041504 | A1 | 2/2017 | Fukuda | |
| 2017/0054684 | A1 | 2/2017 | Ohzaki et al. | |
| 2017/0063871 | A1 | 3/2017 | Kashiyama et al. | |
| 2017/0149788 | A1 | 5/2017 | Ohzaki et al. | |
| 2017/0257377 | A1* | 9/2017 | Vading | H04L 63/108 |

* cited by examiner

FIG.7

| TENANT ID |
| --- |
| TENANT NAME |
| DISPLAY LANGUAGE |
| TIME ZONE |
| STATUS |
| COUNTRY |

FIG.8

| TENANT ID | USER ID | ROLE |
| --- | --- | --- |
| tenant1 | user1 | TenantAdmin |
| tenant1 | user2 | CE |
| tenant1 | user3 | CE |
| tenant1 | user3 | User |
| tenant2 | userA | TenantAdmin |
| tenant2 | userB | Developer |
| tenant2 | userC | User |
| tenant3 | userX | TenantAdmin |
| tenant3 | userY | User |
| tenantX | userX1 | TenantAdmin |
| tenantX | userX2 | CE |
| tenantY | userY | TenantAdmin |

FIG.9

| LICENSE TYPE | TENANT ID | SOURCE TENANT ID | STATUS |
|---|---|---|---|
| Tenant | tenant1 | – | active |
| CE | tenant1 | – | active |
| Tenant | tenant2 | tenant1 | active |
| Develop | tenant2 | tenant1 | active |
| Tenant | tenant3 | tenant1 | active |
| Tenant | tenantX | tenant1 | active |
| CE | tenantX | tenant1 | active |
| Tenant | tenantY | tenantX | active |
| Develop | tenantY | tenantX | inactive |

FIG.11

CREATE TENANT

| TENANT ID | tenantX | ~701 |

TENANT ADMINISTRATOR

| USER ID | tenant_admin | ~702 |
| PASSWORD | ******** | ~703 |
| FAMILY NAME | Yamada | |
| FIRST NAME | Taro | ~704 |

CREATE NEW USER

| USER ID | new_user | ~711 |
| PASSWORD | ******** | ~712 |
| FAMILY NAME | Suzuki | |
| FIRST NAME | Ichiro | ~713 |
| ROLE | TENANT ADMINISTRATOR ▼ | ~714 |

- TENANT ADMINISTRATOR
- CUSTOMER ENGINEER
- NORMAL USER

INFORMATION PROCESSING SYSTEM, INFORMATION PROCESSING METHOD, AND INFORMATION PROCESSING APPARATUS

CROSS-REFERENCE TO RELATED APPLICATION

The present application claims priority under 35 U.S.C. § 119 to Japanese Patent Application No. 2017-049848, filed on Mar. 15, 2017, the contents of which are incorporated herein by reference in their entirety.

BACKGROUND OF THE INVENTION

1. Field of the Invention

The present disclosure relates to an information processing system, an information processing method, and an information processing apparatus.

2. Description of the Related Art

Several service delivery models are known in the information technology field. One model is referred to as "SaaS (Software as a Service)" in which a user can use a service by freely choosing only a desired software function. Another model is referred to as "cloud computing", in which a service is provided to an end user by combining computing resources on the Internet.

With respect to these service delivery models, there is known a method of providing services of multiple enterprises using a single system, to reduce resources or operational cost (see Japanese Patent No. 5930847 for example). Such a method is referred to as a "multitenant service", and a system for providing a multitenant service is referred to as a "multitenant system".

SUMMARY OF THE INVENTION

According to one aspect of the present invention, there is provision of an information processing system including multiple information processing apparatuses for providing a multitenant service. The information processing system is configured: to store a user account for each user belonging to one of a plurality of tenants provided by the multitenant service, the user account including a tenant ID of the tenant, and a role representing privilege of the user; to store license information assigned to each of the tenants, the license information including a license type representing a type of task allowed to be performed by the tenant; to receive a first request, from a first user belonging to a first tenant, for performing a task concerning a second tenant; and to determine, based on the role of the first user and the license information assigned to the first tenant, whether the performing of the task concerning the second tenant is allowed.

BRIEF DESCRIPTION OF THE DRAWINGS

FIG. 7 is a diagram illustrating an example of tenant information;

FIG. 8 is a diagram illustrating an example of user information;

FIG. 9 is a diagram illustrating an example of license information;

FIG. 11 illustrates an example of a tenant administrator setup window in a tenant creation screen;

FIG. 12 illustrates an example of a new user creation window in the tenant creation screen;

DETAILED DESCRIPTION OF THE PREFERRED EMBODIMENTS

In the related art, when a multitenant system is to be configured such that an administrator managing one tenant in the multitenant system can manage data in other tenants, management of access privilege per tenant assigned to the administrator may become difficult.

Therefore, one of purposes of the present disclosure is to provide a technique for managing access privilege per tenant in a multitenant system more appropriately.

In the following, an embodiment of the present disclosure will be described with reference to the drawings.

<System Configuration>

Figure 1:
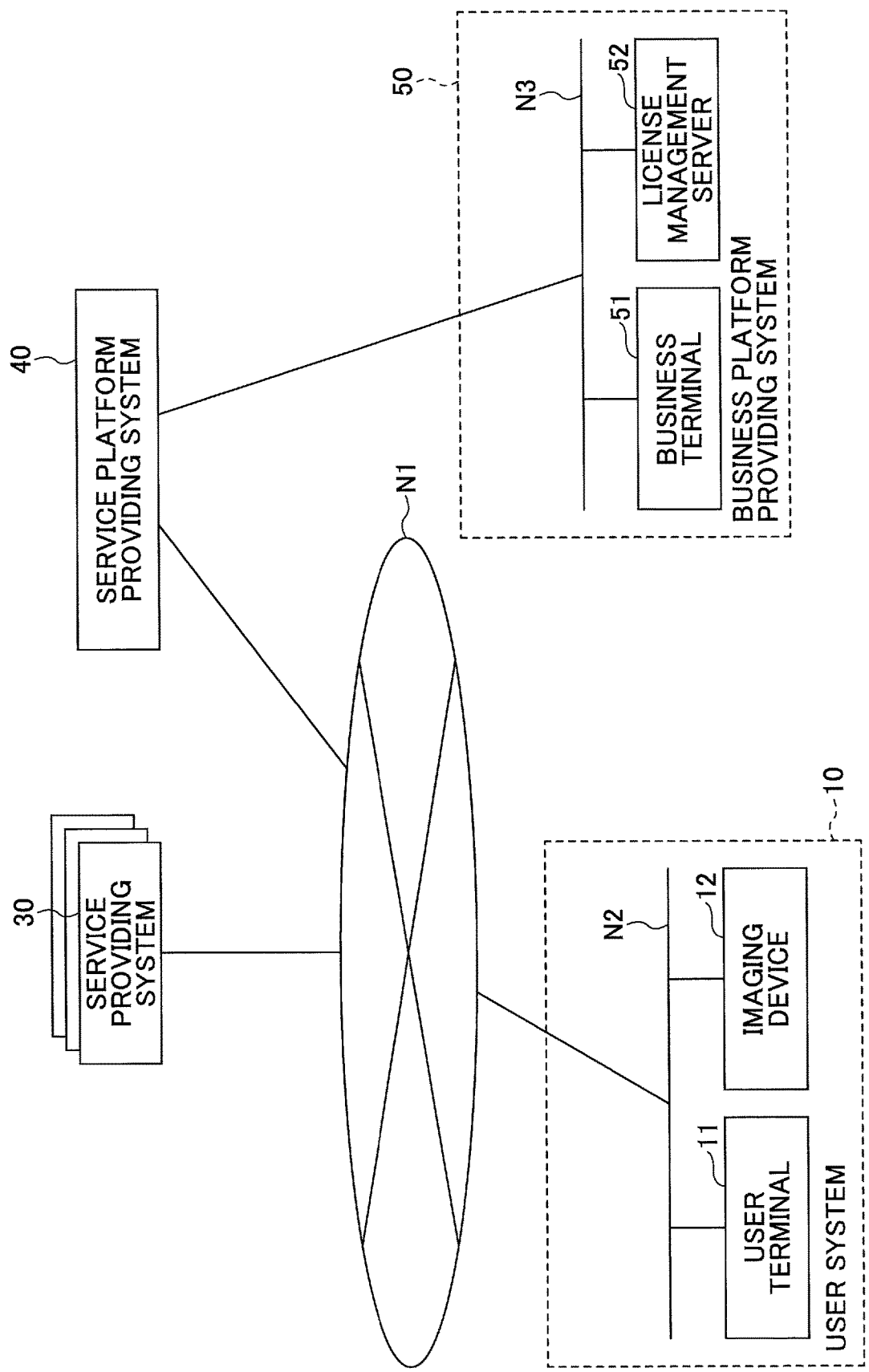
FIG. 1 is a diagram illustrating an example of a configuration of an information processing system according to an embodiment.

FIG. 1 is a diagram illustrating an example of a configuration of an information processing system according to the present embodiment. The information processing system 1 illustrated in FIG. 1 includes a user system 10, a service providing system 30, a service platform providing system 40, and a business platform providing system 50.

The user system 10, the service providing system 30, and the service platform providing system 40 are connected to each other via a network N1, such as the Internet. Also, the service platform providing system 40 is connected to the business platform providing system 50 via a private line or the like.

A network N2 in the user system 10 is a private network inside a firewall. The firewall is provided in order to detect and block an unauthorized access. A user terminal 11, and an imaging device 12 such as a multifunction peripheral, are connected to the network N2. Note that the imaging device 12 is an example of an electronic device.

The user terminal 11 is a terminal device operable by a user, such as a smartphone, a cellular phone, a tablet terminal, a PC, and the like.

The imaging device 12 is an apparatus performing image processing, such as a multifunction peripheral, a photocopier, a scanner, a printer, a laser printer, a projector, an electronic whiteboard, and the like. FIG. 1 illustrates an example in which one user terminal 11 and one imaging device 12 are present, but multiple user terminals 11 or multiple imaging devices 12 may reside in the user system 10.

The service providing system 30 provides various services to the user terminal 11 or the imaging device 12. The service providing system 30 can be embodied by at least one information processing apparatus in which a generic operating system (OS) or the like is installed. The services provided by the service providing system 30 may include a service provided by an external service provider or the like, in addition to a service provided by a manager of the service platform providing system 40.

The service platform providing system 40 can be embodied by at least one information processing apparatus in which a generic operating system (OS) or the like is installed.

The service platform providing system 40 has functions such as authentication, authorization, tenant/user management, license management, account registration, and the like. The service platform providing system 40 receives an account registration request or a login request from the user terminal 11 or the imaging device 12. The service platform providing system 40 also receives, from the service providing system 30, a request for checking an authentication ticket or a request for acquiring user information.

A network N3 in the business platform providing system 50 is a private network inside a firewall. A business terminal 51 and a license management server 52 are connected to the network N3. The business terminal 51 and the license management server 52 can be respectively embodied by at least one information processing apparatus in which a generic operating system (OS) or the like is installed.

The business terminal 51 has a wired communication means or a wireless communication means. The business terminal 51 is a terminal device operable by a service representative, such as a smartphone, a cellular phone, a tablet terminal, a PC, and the like. The service representative can make a license issuing request from the business terminal 51 to the license management server 52.

The license management server 52 includes functions such as license management and the like. The license management server 52 receives a request for issuance of a license or the like from the service, platform providing system 40 or the business terminal 51. Note that the configuration of the information processing system 1 illustrated in FIG. 1 is just an example, and other configurations may be adopted.

<Hardware Configuration>

Figure 2:
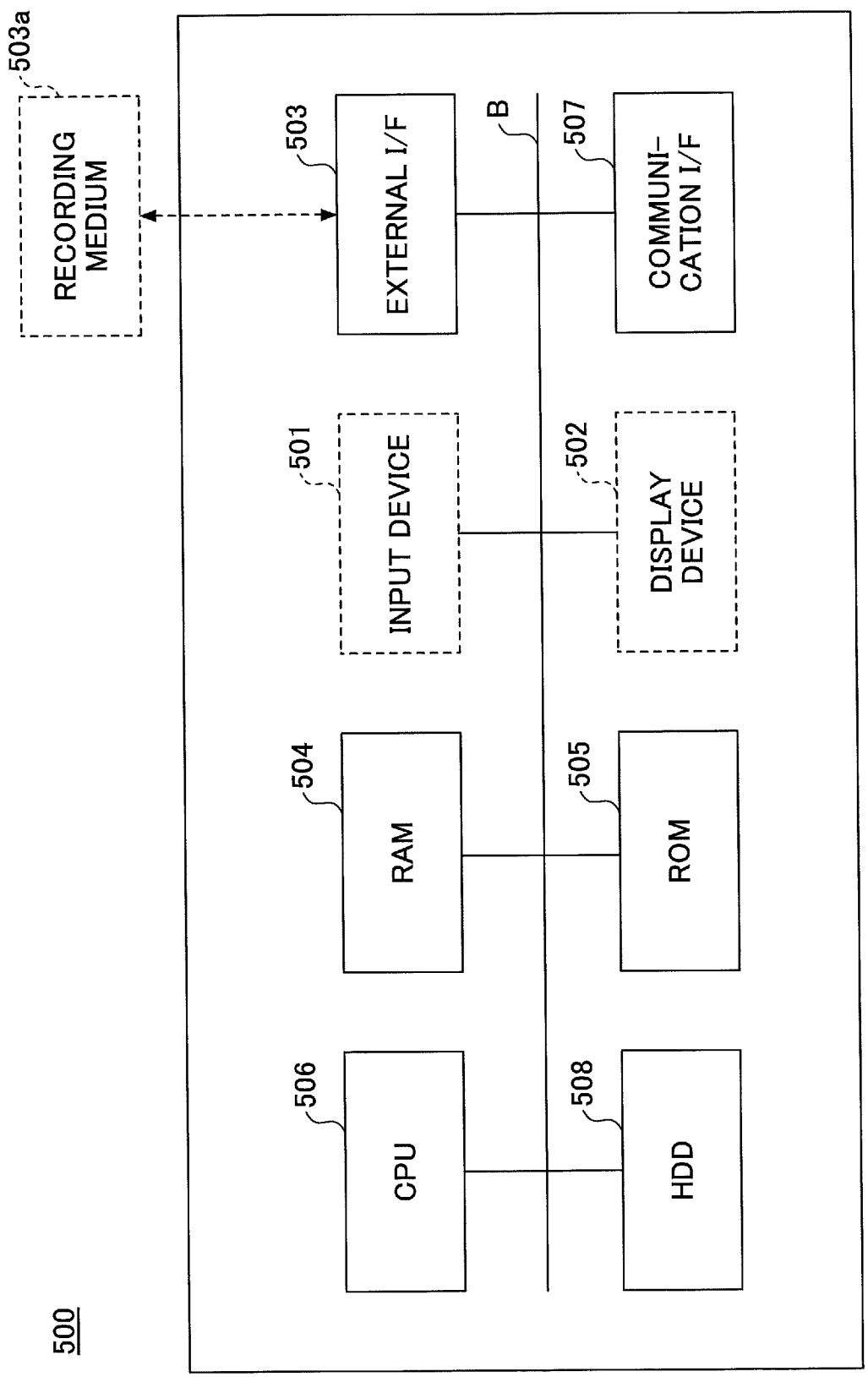
FIG. 2 is a diagram illustrating an example of a hardware configuration of a computer according to the embodiment.

The user terminal 11, the business terminal 51, or the license management server 52 illustrated in FIG. 1 can be embodied by, for example, a computer having a hardware configuration illustrated in FIG. 2. Also, the information processing apparatus embodying the service providing system 30 or the service platform providing system 40 can be embodied by, for example, the computer having the hardware configuration illustrated in FIG. 2. FIG. 2 is a diagram illustrating an example of a hardware configuration of the computer according to the present embodiment.

The computer 500 illustrated in FIG. 2 includes an input device 501, a display device 502, an external I/F 503, a RAM 504, a ROM 505, a CPU 506, a communication I/F 507, an HDD 508, and the like, each of which is interconnected via a bus B. Note that the input device 501 and the display device 502 may be connected to the computer 500 only when they are necessary.

The input device 501 includes a keyboard or a mouse, and is used by a user for inputting various operation signals. The display device 502 includes a display monitor and the like, and is used for displaying a result of a process by the computer 500.

The communication I/F 507 is an interface for connecting the computer 500 to the network N1, N2, or N3. The computer 500 can perform data communication via the communication I/F 507.

The HDD 508 is a non-volatile storage device for storing a program or data. Examples of the program or data stored in the HDD 508 include, an OS which is basic software for controlling the computer 500 in its entirety and the like, and application software working on the OS to provide various functions.

The external I/F 503 is an interface with an external device. An example of the external device includes a recording medium 503a. The computer 500 can read or write data from/to the recording medium 503a via the external I/F 503. Examples of the recording medium 503a include a flexible disk, a CD, a DVD, an SD memory card, a USB memory, and the like.

The ROM 505 is a non-volatile semiconductor memory (storage device) which can retain a program or data even when power is turned-off. In the ROM 505, programs and data, such as BIOS executed at a time of booting up the computer 500, OS setup information, network setup information, and the like, are stored. The RAM 504 is a volatile semiconductor memory for temporarily storing a program or data.

The CPU 506 is a processing unit which performs overall control of the computer 500 and performs various functions of the computer 500, by loading a program or data stored in the ROM 505 or the HDD 508 into the RAM 504, and performing processing.

Because of the hardware configuration of the computer 500 as described above, the user terminal 11, the business terminal 51, or the license management server 52 can perform various processes that will be described below. Similarly, because of the hardware configuration of the computer 500 as described above, the information processing apparatus embodying the service providing system 30 or the service platform providing system 40 can perform various processes that will be described below.

Figure 3:
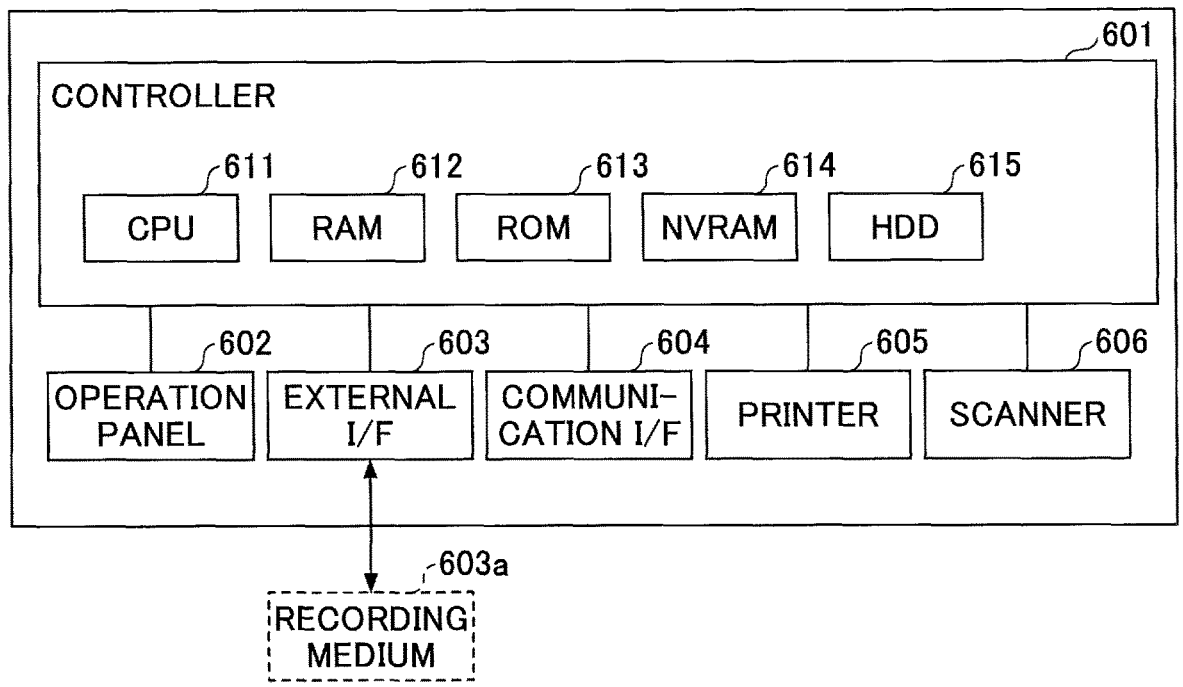
FIG. 3 is a diagram illustrating an example of a hardware configuration of an imaging device according to the embodiment.

The imaging device 12 illustrated in FIG. 1 can be embodied by, for example, a computer having a hardware configuration illustrated in FIG. 3. FIG. 3 is a diagram illustrating an example of a hardware configuration of the imaging device according to the present embodiment. The imaging device 12 illustrated in FIG. 3 includes a controller 601, an operation panel 602, an external I/F 603, a communication I/F 604, a printer 605, a scanner 606, and the like.

The controller 601 includes a CPU 611, a RAM 612, a ROM 613, an NVRAM 614, an HDD 615, and the like. The ROM 613 stores various programs or data. The RAM 612 temporarily stores programs or data. The NVRAM 614 stores, for example, setup information or the like. The HDD 615 stores various programs or data.

The CPU 611 performs overall control of the imaging device 12 and various functions of the imaging device 12, by loading a program, data, setup information, or the like, into the RAM 612 from the ROM 613, the NVRAM 614, or the HDD 615, and by performing processing.

The operation panel 602 includes an input part for receiving an input from a user, and a display part to perform display. The external I/F 603 is an interface with an external device. An example of the external device includes a recording medium 603a. The imaging device 12 can read or write data from/to the recording medium 603a via the external I/F 603. Examples of the recording medium 603a include an IC card, a flexible disk, a CD, a DVD, an SD memory card, a USB memory, and the like.

The communication I/F 604 is an interface for connecting the imaging device 12 to the network N2. The imaging device 12 can perform data communication via the communication I/F 604. The printer 605 is a printing device for printing print data on a paper. The scanner 606 is an image reading device for reading image data (an electronic data) from a paper document. Note that a description of a hardware configuration of a firewall mentioned above will be omitted.

<Software Configuration>
<Service Providing System>

Figure 4:
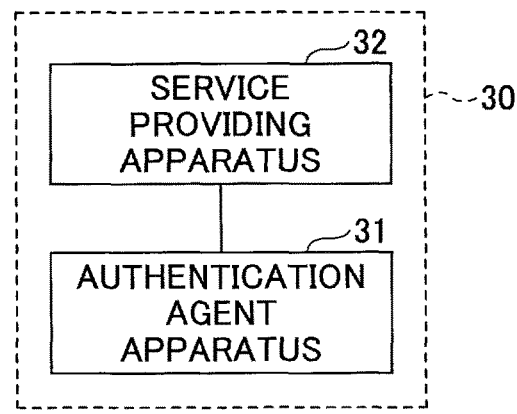
FIG. 4 is a diagram illustrating an example of a configuration of a service providing system according to the embodiment.

The service providing system 30 according to the present embodiment can be embodied by, for example, a configuration illustrated in FIG. 4. FIG. 4 is a diagram illustrating an example of a configuration of the service providing system according to the present embodiment. The service providing system 30 illustrated in FIG. 4 includes an authentication agent apparatus 31, and a service providing apparatus 32.

The authentication agent apparatus 31 receives, from the user terminal 11 or the imaging device 12, various requests targeted to the service providing apparatus 32. The authentication agent apparatus 31 sends a request, which is received from the user terminal 11 or the imaging device 12 including a valid authentication ticket issued by the service platform providing system 40, to the service providing apparatus 32. Further, the authentication agent apparatus 31 redirects a request, which is received from the user terminal 11 or the imaging device 12 and which is not including a valid authentication ticket, to the service platform providing system 40. After the authentication agent apparatus 31 makes the user terminal 11 or the imaging device 12 acquire a valid authentication ticket, the authentication agent apparatus 31 sends the request from the user terminal 11 or the imaging device 12 to the service providing apparatus 32.

The service providing apparatus 32 provides a service according to a request from the user terminal 11 or the imaging device 12. The service providing apparatus 32 also inquires of the service platform providing system 40 validity of an authentication ticket, or requests the service platform providing system 40 to acquire information necessary for providing a service.

An example of a service provided by the service providing apparatus 32 includes a translation service. After the imaging device 12 performs an optical character recognition (OCR) process of image data scanned from a paper document, the imaging device 12 can utilize the translation service provided by the service providing apparatus 32 by sending the processed data to the service providing apparatus 32. A user may read a result of the translation by accessing the service providing apparatus 32 using the user terminal 11, or receive the result of the translation via e-mail.

<Service Platform Providing System>

Figure 5:
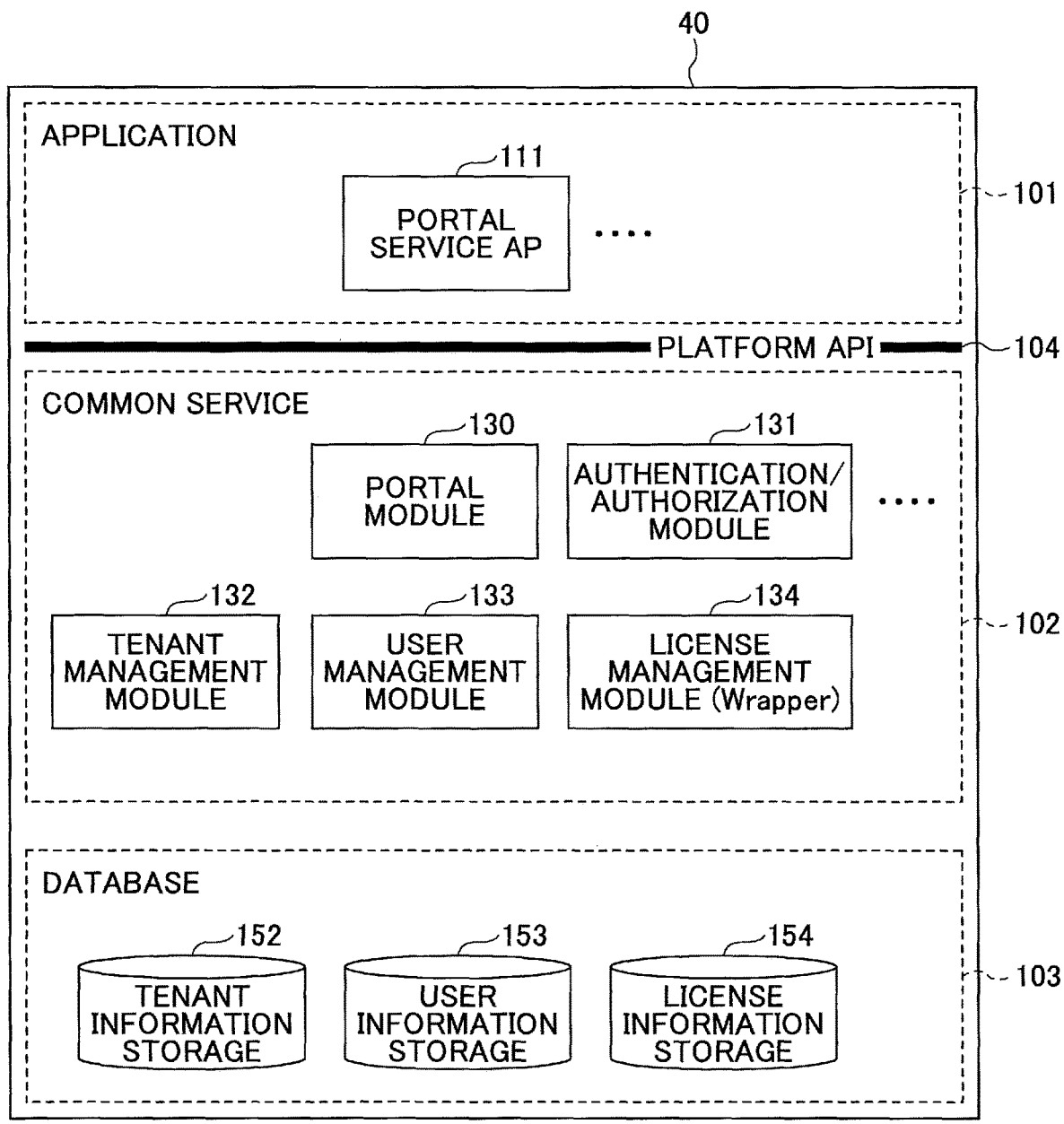
FIG. 5 illustrates an example of a processing block diagram of a service platform providing system according to the embodiment.

The service platform providing system 40 according to the present embodiment can be embodied by, for example, processing blocks illustrated in FIG. 5. FIG. 5 illustrates an example of a processing block diagram of the service platform providing system according to the present embodiment. Each processing block illustrated in FIG. 5 can be embodied by at least one processor (such as the CPU 506 in FIG. 2) in the service platform providing system 40 executing programs.

The service platform providing system 40 illustrated in FIG. 5 includes an application 101, a common service 102, a database (DB) 103, and a platform API (Application Programming Interface) 104.

The application 101 includes, for example, a portal service AP 111.

The portal service AP 111 is an application program for providing a portal service. The portal service is a service which is an entrance for using the information processing system 1.

The platform API 104 is a set of interfaces which are used by the application 101 such as the portal service AP 111 when using the common service 102.

The platform API 104 is a set of interfaces that are defined in advance so that the common service 102 can receive a request from the application 101. For example, the platform API 104 includes functions or classes. When the service platform providing system 40 is configured by multiple information processing apparatuses, the platform API 104 may be implemented by an API capable of being utilized via a network, such as Web API.

The common service 102 includes a portal module 130, an authentication/authorization module 131, a tenant management module 132, a user management module 133, and a license management module 134.

The portal module 130 is a functional unit to perform a process of the portal service AP 111. The portal module 130 also determines, based on a type of a license of a first tenant to which a first user belongs, and privilege of the first user, whether data concerning a second tenant, which is different from the first tenant, can be changed or not. After the determination, the portal module 130 sends a screen based on the determination to the user terminal 11.

The authentication/authorization module 131 performs an authentication based on a login request from office equipment such as the user terminal 11 or the imaging device 12. The office equipment is a general term for the user terminal 11, the imaging device 12, and the like. Also, when creating a new tenant or a new user, the authentication/authorization module 131 determines, based on a type of a license of a first tenant to which a first user belongs, and privilege of the first user, whether data concerning a second tenant, which is different from the first tenant, can be changed or not.

The authentication/authorization module 131 authenticates a user, by accessing a user information storage 153, a license information storage 154, or the like, which will be described below. The authentication/authorization module 131 also authenticates a client such as the imaging device 12 by accessing a tenant information storage 152, the license information storage 154, or the like, which will be described below.

The tenant management module 132 manages types of license representing propriety of service provision to the user terminal 11 or the imaging device 12. The types of license are managed for each tenant. More specifically, the tenant management module 132 manages tenant information stored in the tenant information storage 152, which will be described below.

The user management module 133 manages privileges of each user belonging to each tenant managed by the tenant management module 132. More specifically, the user management module 133 manages user information stored in the user information storage 153, which will be described below.

The license management module 134 manages license information stored in the license information storage 154, which will be described below.

The database 103 includes the tenant information storage 152, the user information storage 153, and the license information storage 154.

The user information storage 153 stores user information which will be described later. The license information storage 154 stores license information which will be described later. The database 103 can be embodied by a storage device such as the HDD 508. Therefore, information stored in the tenant information storage 152, the user information storage 153, and the license information storage 154 are actually recorded in the storage device.

The service platform providing system 40 acts as an integrated infrastructure which provides common services such as authentication/authorization, and a workflow concerning image processing, and as a service group which provides, by utilizing functions of the integrated infrastructure, application services such as a scan service, a print service, and the like.

The integrated infrastructure includes, for example, the common service 102, the database 103, and the platform API 104. The service group includes, for example, the application 101. As described here, the service platform providing system 40 is configured such that the service group and the integrated infrastructure are separated.

Because the service group and the integrated infrastructure are separate, users of the service platform providing system 40 illustrated in FIG. 5 can easily develop the application 101 utilizing the platform API 104. Also, users of the service platform providing system 40 illustrated in FIG. 5 can easily develop the service providing apparatus 32 utilizing the platform API 104.

Note that a configuration of the service platform providing system 40 illustrated in FIG. 5 is one example. It is not necessary that the service platform providing system 40 is hierarchically configured of the application 101, the common service 102, the database 103, and the platform API 104, as illustrated in FIG. 5. The hierarchical relationship for each processing block is not limited to that illustrated in FIG. 5, and any types of configurations can be adopted in the service platform providing system 40 as long as processes of the service platform providing system 40 can be performed.

<Collaboration Between Service Providing System and Service Platform Providing System>

Figure 6:
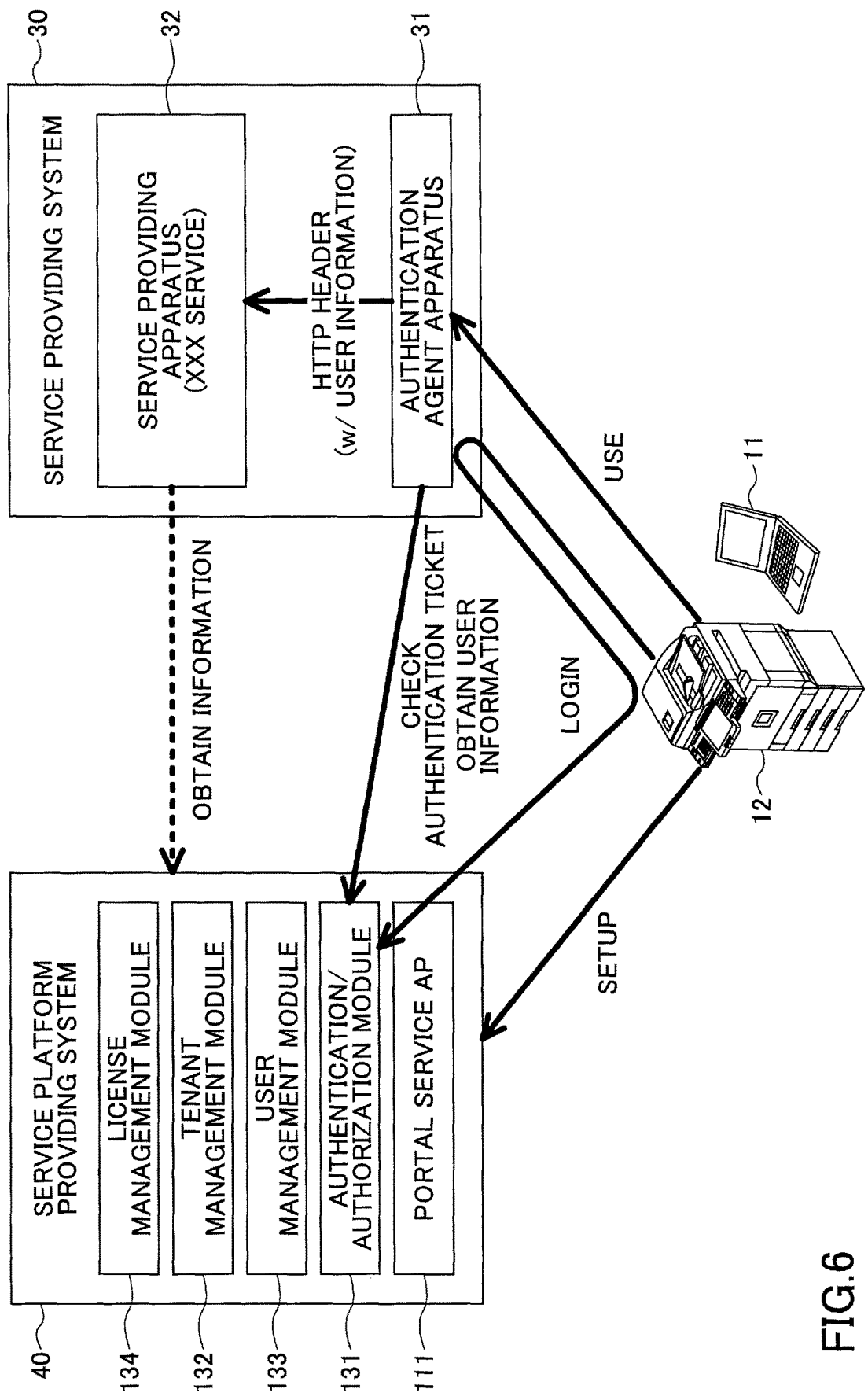
FIG. 6 is a diagram illustrating an example of a process when a service is provided to the imaging device.

The service providing system 30 also provides services to the user terminal 11 and the imaging device 12 by collaborating with the service platform providing system 40, as illustrated in FIG. 6. FIG. 6 is a diagram illustrating an example of a process when a service is provided to the imaging device.

As illustrated in FIG. 6, a user of the information processing system 1 can perform various settings in the service platform providing system 40 from the user terminal 11 or the imaging device 12. When a user uses a service provided by the service providing system 30 from the user terminal 11 or the imaging device 12, the user issues a request from the user terminal 11 or the imaging device 12 to the service providing system 30.

As mentioned earlier, the authentication agent apparatus 31 in the service providing system 30 redirects the request, which is received from the user terminal 11 or the imaging device 12, and which is not including a valid authentication ticket, to the service platform providing system 40. The user, operating the user terminal 11 or the imaging device 12, logs in to the service platform providing system 40, and obtains a valid authentication ticket from the service platform providing system 40.

The user terminal 11 or the imaging device 12 issues a request including the valid authentication ticket obtained to the service providing system 30. The authentication agent apparatus 31 in the service providing system 30 can check validity of the authentication ticket included in the request from the user terminal 11 or the imaging device 12, by inquiring of the service platform providing system 40. The authentication agent apparatus 31 may also add user information to an HTTP header to be sent from the authentication agent apparatus 31 to the service providing apparatus 32 by inquiring of the service platform providing system 40, if the user information is necessary.

The service providing apparatus 32 provides a service in accordance with the request issued from the user terminal 11 or the imaging device 12. The service providing apparatus 32 may provide a service in accordance with the request issued from the user terminal 11 or the imaging device 12, by using information obtained from the service platform providing system 40.

<Information>

FIG. 7 is a diagram illustrating an example of tenant information. The tenant information illustrated in FIG. 7 includes, as data items, a tenant ID, a tenant name, a display language, a time zone, status, a country, and the like.

The tenant ID is information for identifying a group (organization) such as a company, a division, or the like. The tenant ID is not necessarily information directly related to a tenant. For example, the tenant ID may be information identifying a contract. Note that a tenant ID is unique.

The tenant name represents a name of the group such as a company, a division, or the like. The display language represents a language for displaying a name of the group such as a company, a division, or the like. The display language also represents a language for displaying on a browser, or a language of a mail body. The time zone represents a standard time zone used by the group such as a company, a division, or the like. The status represents a current state of the group such as a company, a division, or the like. The country represents a country to which the group, such as a company, a division, or the like, belongs.

FIG. 8 is a diagram illustrating an example of user information. The user information illustrated in FIG. 8 includes, as data items, a tenant ID, a user ID, a role, and the like. The user ID is identification information of a user. The role is information representing a type of privilege (right to perform specific task(s)) assigned to a user. In the present embodiment, the following types of role may be assigned to a user: "tenant administrator (TenantAdmin)", "customer engineer (CE)", "developer (Developer)", and "normal user (User)".

A user, to whom "TenantAdmin" role is assigned, has a right to manage a tenant to which the user belongs, and can create a user account of another user belonging to the tenant.

A user to whom "CE" role is assigned has a right to create a new tenant, and can issue a license for the new tenant, create the new tenant, create a tenant administrator account for the new tenant, and issue various licenses to the new tenant. A user, to whom "Developer" role is assigned, can develop the application 101.

FIG. 9 is a diagram illustrating an example of license information. The license information includes, as data items, a license type, a tenant ID, a source tenant ID, status, and the like.

The license type is information representing a type of a license assigned to a tenant. The license type includes "tenant license (Tenant)", "customer engineer license (CE)", and "developer license (Develop)". The "tenant license (Tenant)" is a license for normal tenant use, and is a license which can provide a service in accordance with a request issued from the user terminal 11 or the imaging device 12. The "customer engineer license (CE)" is a license for a distributor (dealer) of a license, or for an operator of the information processing system 1, and the "customer engineer license (CE)" can be utilized for functions for creating a new tenant and the like, in addition to functions of normal tenant use. The "developer license (Develop)" is a license for a developer for developing the service providing apparatus 32, and the "developer license (Develop)" can be utilized for function for developers such as registration of an application 101, in addition to functions of normal tenant use.

The source tenant ID represents a tenant ID of a tenant to which a customer engineer who issued a license belongs. Hereinafter, a tenant indicated by the source tenant ID (e.g. a tenant to which a customer engineer who issued a license belongs) will be referred to as a "source tenant". FIG. 9 illustrates an example in which "tenant1" is recorded in the source tenant ID column on a row having a tenant ID "tenant2" and a license type "Tenant". This represents that a customer engineer, who issued a "tenant license" to a tenant having a tenant ID "tenant2", belongs to a tenant having a tenant ID "tenant1" (in other words, "tenant1" is a source tenant of "tenant2").

The status represents validity of each license. Either "valid (active)" or "invalid (inactive)" is stored in the status field of the license information. For example, when a contract between a tenant and an operator of the information processing system 1 expires, "invalid (inactive)" is stored in the status field of the license information.

The tenant license is necessary for using the service platform providing system 40. Without a license, users belonging to a tenant cannot use services supported by the service platform providing system 40. The service platform providing system 40 provides service to multiple tenants, and performs independent user management on a per tenant basis. The service platform providing system 40 also performs access control such that referencing data across tenants is prohibited. Hence, before using services, it is necessary to create a tenant.

<Process>
<Creating New Tenant>

Figure 10:
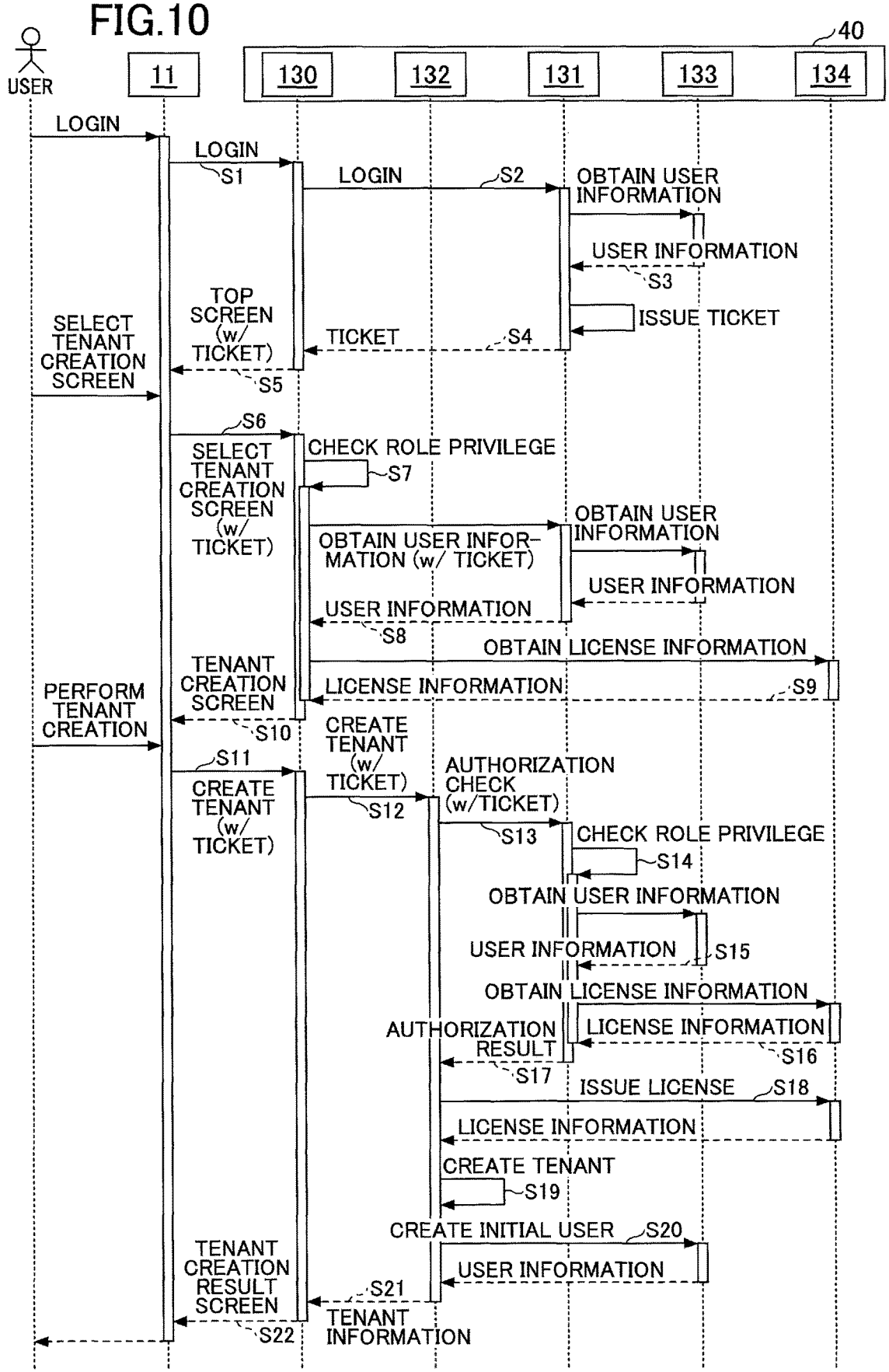
FIG. 10 is a sequence diagram illustrating an example of a process for creating a new tenant.

Next, with reference to FIG. 10, a process for creating a new tenant performed in the information processing system according to the present embodiment will be described. FIG. 10 is a sequence diagram illustrating an example of the process for creating a new tenant.

At step S1, when the user terminal 11 receives a login operation from a user, the user terminal 11 sends a login request to the portal module 130 in the service platform providing system 40. The login request includes a user ID of the user and a tenant ID of a tenant to which the user belongs.

Next, the portal module 130 transfers the received login request to the authentication/authorization module 131 (step S2).

Next, the authentication/authorization module 131 obtains user information stored in the user information storage 153 (step S3). At step S3, within a set of the user information illustrated in FIG. 8, a user information entry in which the user ID and the tenant ID correspond to the user ID and the tenant ID included in the login request, is obtained.

Next, the authentication/authorization module 131 issues an authentication ticket to the portal module 130 (step S4).

Next, the portal module 130 sends data of the top screen to be displayed on the user terminal 11 to the user terminal 11 (step S5). The data sent from the portal module 130 also includes the received ticket.

Next, when the user terminal 11 receives an operation for selecting a tenant creation operation from a user, the user terminal 11 sends a request for selecting the tenant creation operation to the portal module 130 (step S6). The request for selecting the tenant creation operation includes data of the authentication ticket as described above.

Next, the portal module 130 checks role privilege (step S7). The process performed at steps S7 through S9 is referred to as a "role privilege check process". Details of the role privilege check process will be described below.

Next, the portal module 130 obtains user information from the user management module 133 via the authentication/authorization module 131 (step S8).

Next, the portal module 130 obtains license information stored in the license information storage 154 from the license management module 134 (step S9).

Next, the portal module 130 sends screen data of a tenant creation screen to the user terminal (step S10).

FIG. 11 illustrates an example of a tenant administrator setup window in the tenant creation screen. When step S10 is performed, the tenant administrator setup window is displayed on the user terminal 11. A tenant ID input box 701 for inputting a tenant ID of a tenant to be newly created, a user ID input box 702, a password input box 703, and name input boxes 704, each of which is for inputting a user ID, a password, and a name of an administrator of the tenant, are displayed in the tenant administrator setup window, to receive inputs from the user.

FIG. 12 illustrates an example of a new user creation window in the tenant creation screen. When step S10 is performed, the new user creation window is displayed on the user terminal 11. Note that the new user creation window illustrated in FIG. 12 may be displayed after the user completes entering information to the tenant administrator setup window illustrated in FIG. 11.

A user ID input box 711, a password input box 712, name input boxes 713, and a role input box 714 for inputting information of a new user are displayed in the new user creation window, to receive inputs from the user. FIG. 12 illustrates an example of the window in which "customer engineer" role can be selected.

Next, when the user terminal 11 receives a tenant creation operation from a user, the user terminal 11 sends a tenant creation request to the portal module 130 (step S11). The tenant creation request includes data of the authentication ticket as described above.

Next, the portal module 130 transfers the received tenant creation request to the tenant management module 132 (step S12).

Next, the tenant management module 132 sends an authorization check request to the authentication/authorization module 131 (step S13).

Next, the authentication/authorization module 131 checks role privilege (step S14). Note that the process performed at steps S14 through S16 corresponds to the role privilege check process. Details of the role privilege check process will be described later.

Next, the authentication/authorization module 131 obtains user information from the user management module 133 (step S15).

Next, the authentication/authorization module 131 obtains license information stored in the license information storage 154 from the license management module 134 (step S16).

Next, the authentication/authorization module 131 returns a result of the authorization to the tenant management module 132 (step S17).

Next, the tenant management module 132 sends a request for issuing a license (such as a "tenant license") to the license management module 134, to obtain license information from the license management module 134 (step S18). At step S18, information concerning the issued license is stored in the license information illustrated in FIG. 9. When, for example, a tenant license is issued, a row having the license type of "Tenant" is created in the license information. Also, a tenant ID of the new tenant and a tenant ID of a source tenant is recorded in the row.

Suppose that the user information illustrated in FIG. 8 is stored in the information processing system 1 and that a user whose user ID is "user2" (an example of "first user") belonging to a tenant whose tenant ID is "tenant1" created a new tenant whose tenant ID is "tenant2". In this case, "tenant2" is recorded into the tenant ID column of the created row in the license information. Furthermore, because "tenant1" is a creator (source tenant) of the "tenant2", "tenant1" is recorded in the source tenant ID column of the created row as illustrated in FIG. 9, to correlate the new tenant with the source tenant.

Next, the tenant management module 132 creates a new tenant (step S19). At step S19, data of a new tenant is registered with the tenant information stored in the tenant information storage 152.

Next, the tenant management module 132 sends a request for creating an initial user to the user management module 133, and obtains user information from the user management module 133 (step S20). At step S20, a given initial user ID, correlated with the tenant ID of the new tenant, is registered with the user information stored in the user information storage 153.

Next, the tenant management module 132 sends tenant information stored in the tenant information storage 152 to the portal module 130 (step S21).

Next, the portal module 130 sends screen data of a result of tenant creation to the user terminal (step S22).

Figure 13:
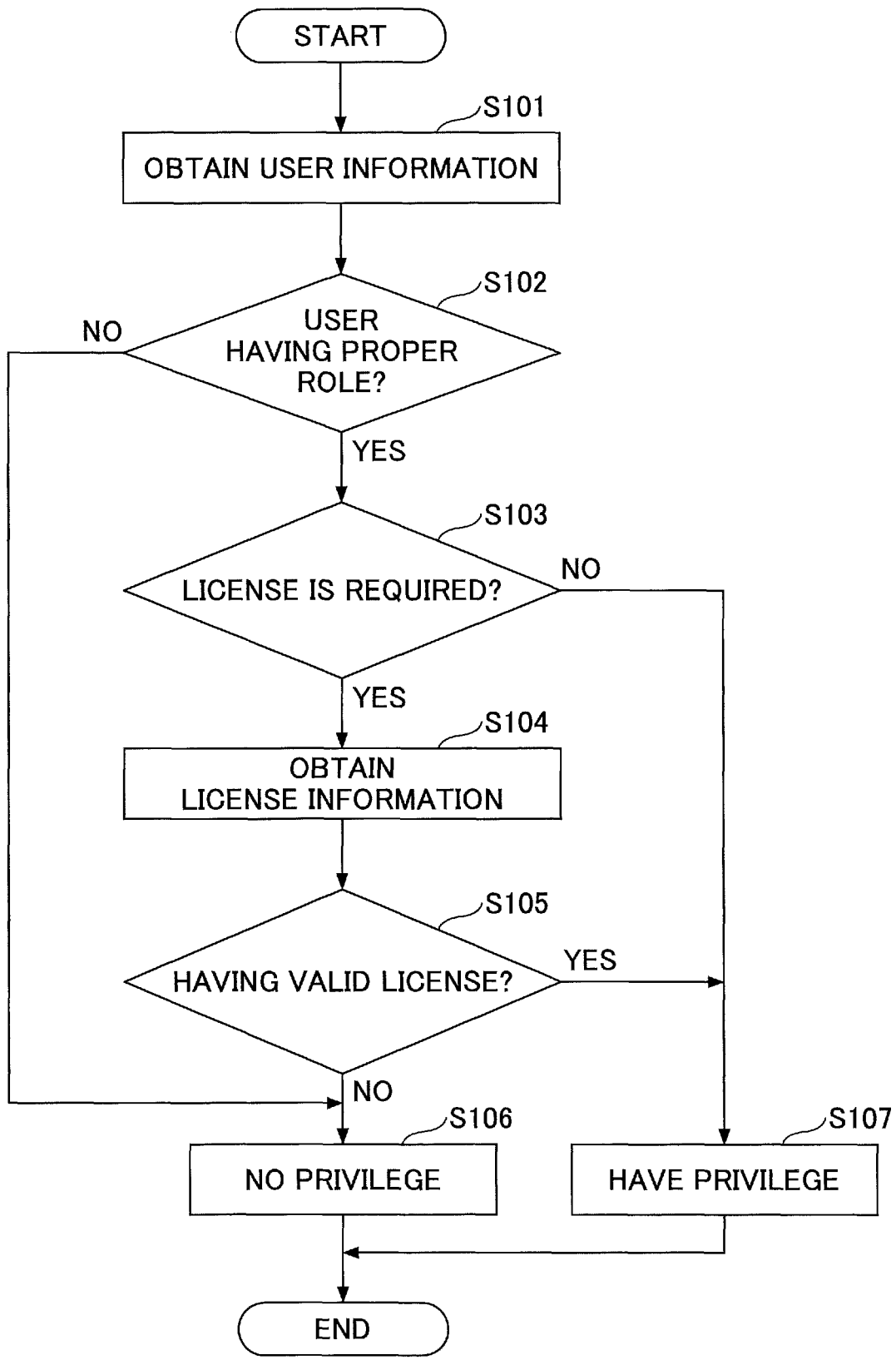
FIG. 13 is a flowchart illustrating an example of a role privilege check process.

Next, the role privilege check process, performed in the process illustrated in FIG. 10, will be described with reference to FIG. 13. FIG. 13 is a flowchart illustrating an example of the role privilege check process. The following describes an example in which the portal module 130 performs the role privilege check process. However, the role privilege check process may be performed by other modules, such as the authentication/authorization module 131 and the like.

At step S101, the portal module 130 obtains user information.

Next, the portal module 130 determines whether a proper role is assigned to the user who issued the request (hereinafter, the user is referred to as a "requester") (step S102). The "proper" role mentioned here should be a specific role corresponding to a task that the requester wants to perform. When, for example, the requester starts creating a new tenant as illustrated in FIG. 10, if "customer engineer (CE)" role is assigned to the requester, it is determined that a proper role is assigned to the requester at step S102. On the other hand, if "tenant administrator (TenantAdmin)" role is assigned but "customer engineer (CE)" role is not assigned, it is determined at step S102 that a proper role is not assigned to the requester.

If a proper role is not assigned to the requester (NO at step S102), the process proceeds to step S106 which will be described later.

If a proper role is assigned to the requester (YES at step S102. Hereinafter, the proper role assigned to the requester will be referred to as "the assigned role"), the portal module 130 determines whether a license is required for providing services (executing functions) corresponding to the assigned role (step S103).

If a license is not required (NO at step S103), the process proceeds to step S107.

If a license is required (YES at step S103), the portal module 130 obtains license information of a tenant to which the requester belongs (step S104).

Next, the portal module 130 determines whether the tenant, to which the requester belongs, owns a valid (active) license required for providing services (executing functions) corresponding to the assigned role (step S105).

If the tenant does not own the license required for providing the services corresponding to the assigned role, or if the tenant owns the license but the status of the license is not valid (active) license (NO at step S105), the portal module 130 determines that the user has "no privilege" (step S106), and terminates the process.

If the tenant owns a valid (active) license (YES at step S105), the portal module 130 determines that the user "has privilege" (step S107), and terminates the process. When it is determined the user has "no privilege", steps S10 and thereafter in FIG. 10 will not be performed.

As described above, the service platform providing system 40 determines whether execution of a task requested by a user is allowed or not, based on the role of the user and the license information assigned to the tenant to which the user belongs. Adding a new user account is an example of a task requested by a user. If the user belonging to a certain tenant (for example, "a first tenant") has a proper role (such as "CE" role) and if an appropriate license (such as "CE" license) is assigned to the first tenant, the task for adding a new user account in another tenant (for example, "a second tenant") is allowed. Or in another embodiment, the service platform providing system 40 may permit a requester to create a new user account having a specific role in a new tenant, only when a specific license (corresponding to the specific role) is assigned to a tenant of a requester. For example, with respect to the requester issuing a request to create a new user account, when a "tenant administrator (TenantAdmin)" role is assigned to the requester in the user information illustrated in FIG. 8, a "customer engineer (CE)" license is assigned to the tenant to which the requester belongs in the license information illustrated in FIG. 9, and the status of the license is "valid (active)" in the license information illustrated in FIG. 9, it is determined that the requester "has privilege" in the role privilege check process. In this case, the service platform providing system 40 may display a new user creation window configured such that "customer engineer" role is selectable from the role input box 714 as illustrated in FIG. 12. On the other hand, when it is determined that the requester does not have privilege, the service platform providing system 40 displays a new user creation window illustrated in FIG. 12 in which the "customer engineer" role cannot be selected at the role input box 714.

Even when a "tenant administrator (TenantAdmin)" role is assigned to a requester in the user information illustrated in FIG. 8, if, in the license information illustrated in FIG. 9, a "customer engineer (CE)" license correlated with a tenant of the requester is not registered, it is determined that the requester does not have privilege.

<Issuing License>

Figure 14:
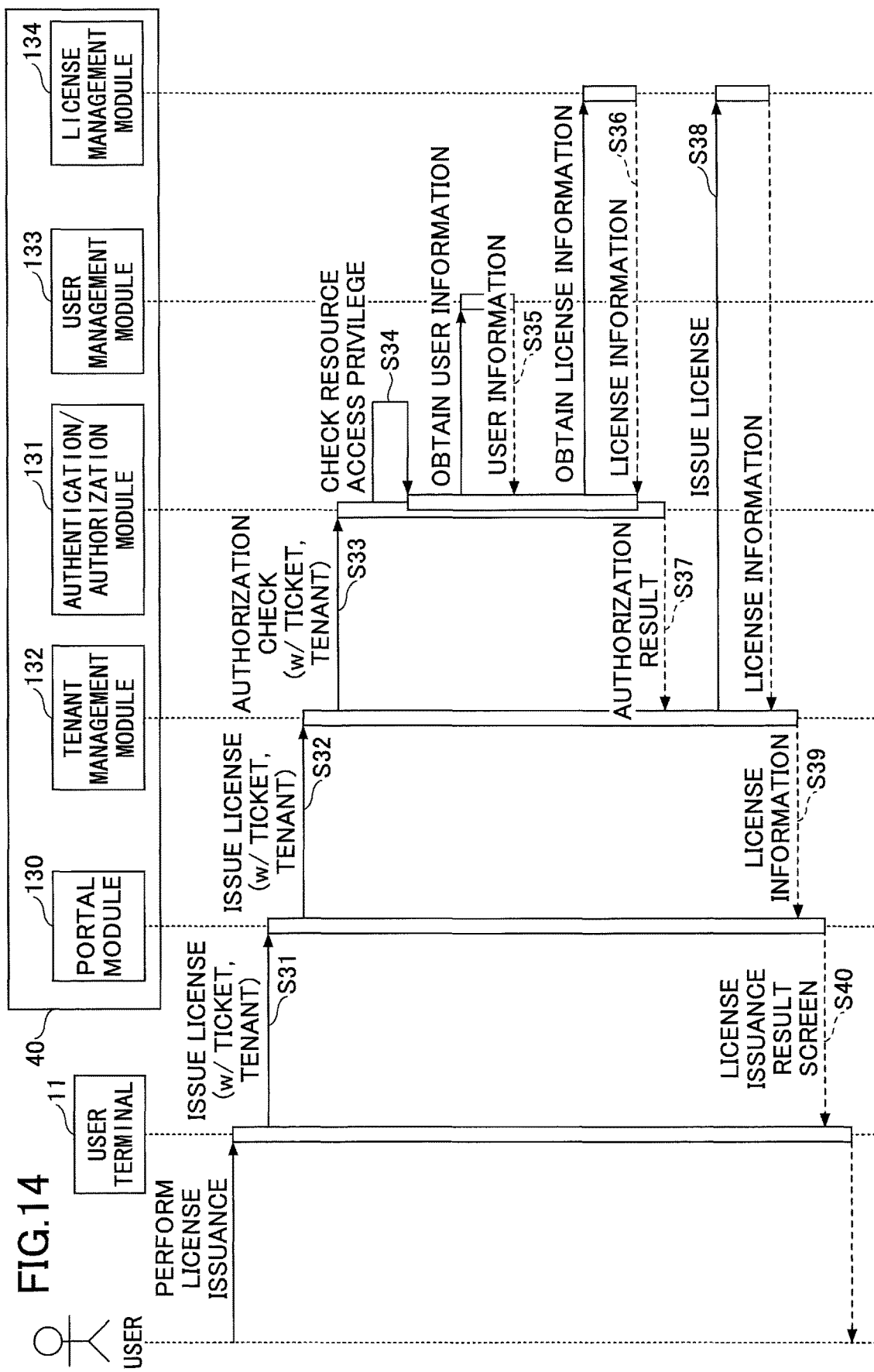
FIG. 14 is a sequence diagram illustrating an example of a process for issuing a license to a tenant.

Next, with reference to FIG. 14, a process for issuing a license to a tenant performed in the information processing system according to the present embodiment will be described. FIG. 14 is a sequence diagram illustrating an example of the process for issuing a license to a tenant. In the following description regarding FIGS. 14 through 16, a tenant to which a license is to be issued is referred to as a "target tenant".

At step S31, when the user terminal 11 receives a license issuance operation from a user, the user terminal 11 sends a license issuance request to the portal module 130 in the service platform providing system 40. The license issuance request includes a user ID of the user, a tenant ID of a target tenant, and the authentication ticket described above.

Figure 15:
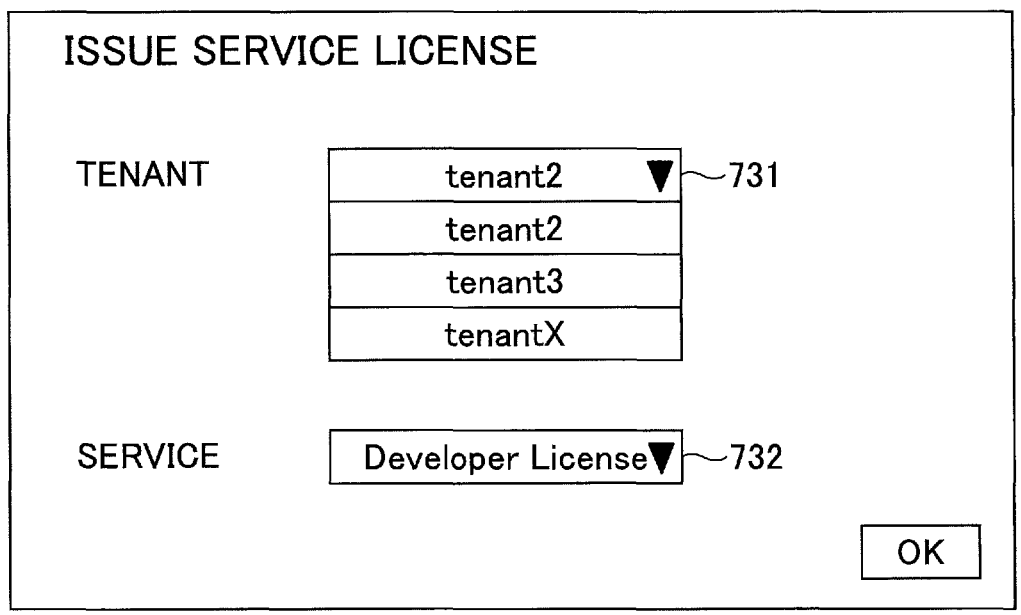
FIG. 15 illustrates an example of a license issuance screen.

FIG. 15 illustrates an example of a license issuance screen. A tenant ID input box 731 for inputting a tenant ID of a target tenant, and a license type input box 732 for inputting a license type to be issued, are displayed on the license issuance screen, to receive inputs from the user. FIG. 15 illustrates an example in which an issuance of "developer license" is requested to a tenant whose tenant ID is "tenant2".

Next, the portal module 130 transfers the received license issuance request to the tenant management module 132 (step S32).

Next, the tenant management module 132 sends an authorization check request to the authentication/authorization module 131 (step S33).

Next, the authentication/authorization module 131 checks resource access privilege (steps S34, S35, and S36). Details of the checking of resource access privilege will be described later.

At step S35, the authentication/authorization module 131 obtains user information stored in the user information storage 153 from the user management module 133.

At step S36, the authentication/authorization module 131 obtains license information stored in the license information storage 154 from the license management module 134.

Next, the authentication/authorization module 131 returns a result of the authorization to the tenant management module 132 (step S37).

Next, the tenant management module 132 sends a license issuance request to the license management module 134, to obtain license information from the license management module 134 (step S38).

Next, the tenant management module 132 transfers the license information to the portal module 130 (step S39).

Next, the portal module 130 sends screen data of a result of license issuance to the user terminal (step S40).

Figure 16:
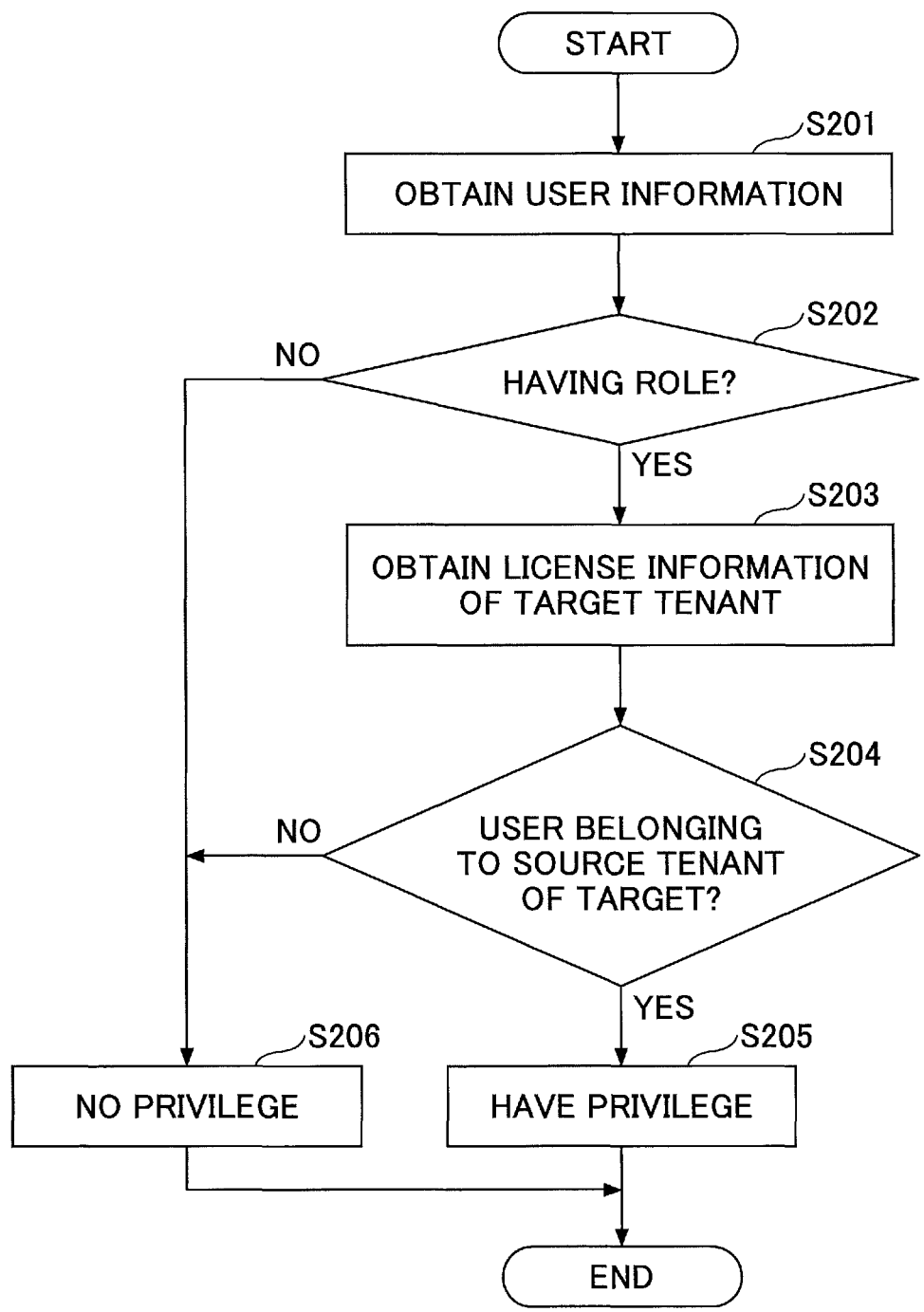
FIG. 16 is a flowchart illustrating an example of a resource access privilege checking process.

Next, the resource access privilege checking process, corresponding to steps S34 through S36, will be described with reference to FIG. 16. FIG. 16 is a flowchart illustrating an example of the resource access privilege checking process.

At step S201, the authentication/authorization module 131 obtains user information.

Next, the authentication/authorization module 131 determines whether a proper role is assigned to the user who issued the request (hereinafter, the user is referred to as a "requester") (step S202). For example, when the user information is such as illustrated in FIG. 8, if the requester is "user2" belonging to a tenant whose tenant ID is "tenant1", the authentication/authorization module 131 determines that a proper role is assigned to the requester because the role of "user2" (requester) is a "customer engineer (CE)" and the user to whom a "customer engineer (CE)" role is assigned can issue a license, as mentioned above.

If it is determined that a proper role is not assigned (NO at step S202), the process proceeds to step S206 which will be described later.

If it is determined that a proper role is assigned (YES at step S202), the authentication/authorization module 131 obtains license information of a tenant (target tenant) to which a license is to be issued (step S203).

Next, the authentication/authorization module 131 determines whether the requester belongs to a source tenant of the target tenant (step S204). For example, when the tenant information is such as illustrated in FIG. 9, if a tenant ID of a target tenant is "tenant2" (which is an example of a "third tenant"), a tenant ID of a source tenant is "tenant1" (which is an example of a "first tenant"). Further, when the user information is such as illustrated in FIG. 8, if a user who issued the request is "user2" or "user3" belonging to a tenant having a tenant ID "tenant1", the authentication/authorization module 131 determines that the user who issued the request belongs to the source tenant of a tenant to which a license is to be issued.

If it is determined that the user who issued the request belongs to the source tenant of the tenant to which a license is to be issued (YES at step S204), the authentication/authorization module 131 determines that the user "has privilege" (step S205). After step S205, the process terminates.

If it is determined that the user who issued the request does not belong to the source tenant of the tenant to which a license is to be issued (NO at step S204), the authentication/authorization module 131 determines that the user has "no privilege" (step S206), and terminates the process. When it is determined that the user has "no privilege", steps S38 and thereafter in FIG. 14 will not be performed.

As described above, when a customer engineer creates a new tenant (suppose that the customer engineer belongs to "tenant1" and that the new tenant to be created here is "tenant2"), the service platform providing system 40 issues a license (such as a "tenant license") to the new tenant (tenant2) and records information concerning the issued license on the license information illustrated in FIG. 9. When recording the issued license on the license information, the service platform providing system 40 also correlates a tenant ID of the tenant (source tenant) to which the customer engineer belongs ("tenant1" in this case) with the issued license. Accordingly, even when another customer engineer tries to issue a license (such as "CE" license) to the new tenant "tenant2", the service platform providing system 40 allows the another customer engineer to issue the license to the new tenant "tenant2" if the another customer engineer belongs to "tenant1" (which means that the another customer engineer belongs to the same tenant as the customer engineer who created "tenant2"), since information indicating that "tenant1" is a source tenant of "tenant2" is recorded in the license information.

Therefore, even a second user having a "customer engineer (CE)" role who is different from a first user having "customer engineer (CE)" role who created a new tenant, can perform management operations of the new tenant if the second user and the first user belong to the same tenant. Also, for example, when a tenant corresponds to a dealer (distributor) of licenses, the information processing system may be configured such that a person (salesperson) belonging to the tenant of the dealer cannot perform management operations of tenants outside of the responsibility of the dealer.

Further, for example, when the user information is such as illustrated in FIG. 8, if a user "user2" having a "customer engineer (CE)" role is to be registered with a tenant "tenant1", and another user "user2" is already registered with a tenant "tenant2", user privilege management may become difficult. In the information processing system according to the present embodiment, the problem does not occur. That is, a user belonging to a given tenant does not need to consider whether the same user ID is used in other tenants or not.

As described above, according to the technique described in the present disclosure, access rights to data for each tenant in a multitenant system can be managed more appropriately.

The information processing system, the information processing method, and the information processing apparatus are not limited to the specific embodiments described above, and variations and enhancements may be applied within the scope of the subject matters described in the claims. Note that the imaging device 12 is an example of a service using device.

What is claimed is:

1. An information processing system comprising a plurality of information processing apparatuses for providing a multitenant service, each of the information processing apparatuses including a processor and a memory storing a program, at least one of the processors configured to execute the program to implement a process of
maintaining user accounts for a plurality of users belonging to one of a plurality of tenants provided by the multitenant service, each of the user accounts including a tenant ID of a tenant of the plurality of tenants to which a corresponding user of the plurality of users belongs, and a role representing privilege of a corresponding user;
maintaining license information assigned to each of the tenants, the license information including a tenant ID of a tenant of the plurality of tenants to which the license information is assigned, and a license type representing a type of task allowed to be performed by the tenant;
assigning the license information to a first tenant of the plurality of tenants, in response to creation of the first tenant;
in response to receiving a first request, from a first user of the plurality of users that belongs to the first tenant, for performing a task concerning a second tenant of the plurality of tenants, the second tenant being different from the first tenant,
determining whether the performing of the task concerning the second tenant is allowed to the first user, by referring to a user account corresponding to the first user and referring to the license information assigned to the first tenant; and
performing the task concerning the second tenant, in response to a determination that the performing of the task concerning the second tenant is allowed to the first user; wherein in a case in which a role assigned to the first user maintained in the user accounts represents that the task concerning the second tenant is allowed to be performed and in which a license type of license information assigned to the first tenant represents that the task concerning the second tenant is allowed to be performed, it is determined that the performing of the task concerning the second tenant is allowed to the first user;
in response to receiving a tenant creation request for creating a third tenant from the first user belonging to the first tenant,
recording, in response to creating the third tenant based on the tenant creation request from the first user belonging to the first tenant, an ID of the first tenant as a source tenant ID of the third tenant, the source tenant ID of the third tenant indicating a tenant to which a user of the plurality of users having instructed the creation of the third tenant belongs; and
in response to receiving a second request from a second user of the plurality of users for performing a task concerning the third tenant, the second user being different from the first user,
allowing the second user different from the first user to perform a task concerning the third tenant, in response to a determination that the role corresponding to the task is assigned to the second user and that an ID of the tenant to which the second user belongs is the same as the source ID of the third tenant.

2. The information processing system according to claim 1, the first request received from the first user being a request to add a new user account to the second tenant, the process further comprising:
determining whether the adding of the new user account to the second tenant is allowed, based on the role of the first user and the license information assigned to the first tenant.

3. The information processing system according to claim 1, the license information including a status representing whether the license information is active or inactive, wherein the determining includes checking whether the license information assigned to the first tenant is active.

4. An information processing method performed by an information processing system for providing a multitenant service, the information processing method comprising:
maintaining user accounts for a plurality of users belonging to one of a plurality of tenants provided by the multitenant service, each of the user accounts including a tenant ID of a tenant of the plurality of tenants to which a corresponding user of the plurality of users belongs, and a role representing privilege of a corresponding user;
maintaining license information assigned to each of the tenants, the license information including a tenant ID of a tenant of the plurality of tenants to which the license information is assigned, and a license type representing a type of task allowed to be performed by the tenant;
assigning the license information to a first tenant of the plurality of tenants, in response to creation of the first tenant;
in response to receiving a first request, from a first user of the plurality of users that belongs to the first tenant, for performing a task concerning a second tenant of the plurality of tenants, the second tenant being different from the first tenant,
determining whether the performing of the task concerning the second tenant is allowed to the first user, by referring to a user account corresponding to the first user and referring to the license information assigned to the first tenant; and
performing the task concerning the second tenant, in response to a determination that the performing of the task concerning the second tenant is allowed to the first user; wherein in a case in which a role assigned to the first user maintained in the user accounts represents that the task concerning the second tenant is allowed to be performed and in which a license type of license information assigned to the first tenant represents that the task concerning the second tenant is allowed to be performed, it is determined that the performing of the task concerning the second tenant is allowed to the first user;

in response to receiving a tenant creation request for creating a third tenant from the first user belonging to the first tenant,
recording, in response to creating the third tenant based on the tenant creation request from the first user belonging to the first tenant, an ID of the first tenant as a source tenant ID of the third tenant, the source tenant ID of the third tenant indicating a tenant to which a user of the plurality of users having instructed the creation of the third tenant belongs; and in response to receiving a second request from a second user of the plurality of users for performing a task concerning the third tenant, the second user being different from the first user,
allowing the second user different from the first user to perform a task concerning the third tenant, in response to a determination that the role corresponding to the task is assigned to the second user and that an ID of the tenant to which the second user belongs is the same as the source ID of the third tenant.

5. The information processing method according to claim 4, the first request received from the first user being a request to add a new user account to the second tenant, the method further comprising:
determining whether the adding of the new user account to the second tenant is allowed, based on the role of the first user and the license information assigned to the first tenant.

6. The information processing method according to claim 4, the license information including a status representing whether the license information is active or inactive, wherein the determining includes checking whether the license information assigned to the first tenant is active.

7. An information processing apparatus for providing a multitenant service comprising a memory storing a program, and a processor configured to execute the program to implement a process of
maintaining user accounts for a plurality of users belonging to one of a plurality of tenants provided by the multitenant service, each of the user accounts including a tenant ID of a tenant of the plurality of tenants to which a corresponding user of the plurality of users belongs, and a role representing privilege of a corresponding user;
maintaining license information assigned to each of the tenants, the license information including a tenant ID of a tenant of the plurality of tenants to which the license information is assigned, and a license type representing a type of task allowed to be performed by the tenant;
assigning the license information to a first tenant of the plurality of tenants, in response to creation of the first tenant;

in response to receiving a first request, from a first user of the plurality of users that belongs to the first tenant, for performing a task concerning a second tenant of the plurality of tenants, the second tenant being different from the first tenant,
determining whether the performing of the task concerning the second tenant is allowed to the first user, by referring to a user account corresponding to the first user and referring to the license information assigned to the first tenant; and
performing the task concerning the second tenant, in response to a determination that the performing of the task concerning the second tenant is allowed to the first user; wherein in a case in which a role assigned to the first user maintained in the user accounts represents that the task concerning the second tenant is allowed to be performed and in which a license type of license information assigned to the first tenant represents that the task concerning the second tenant is allowed to be performed, it is determined that the performing of the task concerning the second tenant is allowed to the first user;

in response to receiving a tenant creation request for creating a third tenant from the first user belonging to the first tenant,
recording, in response to creating the third tenant based on the tenant creation request from the first user belonging to the first tenant, an ID of the first tenant as a source tenant ID of the third tenant, the source tenant ID of the third tenant indicating a tenant to which a user of the plurality of users having instructed the creation of the third tenant belongs; and in response to receiving a second request from a second user of the plurality of users for performing a task concerning the third tenant, the second user being different from the first user,
allowing the second user different from the first user to perform a task concerning the third tenant, in response to a determination that the role corresponding to the task is assigned to the second user and that an ID of the tenant to which the second user belongs is the same as the source ID of the third tenant.

8. The information processing apparatus according to claim 7, the first request received from the first user being a request to add a new user account to the second tenant, the process further comprising:
determining whether the adding of the new user account to the second tenant is allowed, based on the role of the first user and the license information assigned to the first tenant.

9. The information processing apparatus according to claim 7, the license information including a status representing whether the license information is active or inactive, wherein the determining includes checking whether the license information assigned to the first tenant is active.

* * * * *